United States Patent [19]

Kmecak et al.

[11] 3,965,252
[45] June 22, 1976

[54] HYDROGEN PRODUCTION

[75] Inventors: Ronald A. Kmecak; Stephen M. Kovach, both of Ashland, Ky.

[73] Assignee: Ashland Oil, Inc., Ashland, Ky.

[22] Filed: Sept. 23, 1974

[21] Appl. No.: 508,193

Related U.S. Application Data

[60] Continuation-in-part of Ser. No. 327,010, Jan. 20, 1973, abandoned, which is a division of Ser. No. 92,243, Nov. 23, 1970, Pat. No. 3,725,246, which is a continuation of Ser. No. 769,727, Oct. 22, 1968, abandoned.

[52] U.S. Cl. ............................. 423/651; 423/650
[51] Int. Cl.$^2$ .................................... C01B 1/18
[58] Field of Search .................... 423/648, 650, 651

[56] References Cited
UNITED STATES PATENTS

| | | | |
|---|---|---|---|
| 1,899,184 | 2/1933 | DeSimo | 423/651 |
| 1,906,462 | 5/1933 | Grosskinsky | 423/651 X |
| 2,137,101 | 11/1938 | Spicer | 423/651 X |
| 2,760,847 | 8/1956 | Obled et al. | 423/651 X |
| 2,911,288 | 11/1959 | Viles | 423/651 |
| 3,197,284 | 7/1965 | Hoekstra | 423/651 |
| 3,340,012 | 9/1967 | Moehl | 423/651 |
| 3,380,809 | 4/1968 | Newton | 423/649 |
| 3,395,104 | 7/1968 | Taylor et al. | 423/651 X |
| 3,402,022 | 9/1968 | Hayes | 423/651 |

*Primary Examiner*—Edward Stern

[57] ABSTRACT

A process for the production of hydrogen, including contacting a light paraffinic hydrocarbon such as ethane, propane, n-butane, iso-butane, n-pentane, iso-pentane, etc., with a catalyst comprising an active metal selected from the group consisting of a Group VIII metal, such as platinum, rhodium, ruthenium, palladium, and nickel, and a Group VIB metal, such as chromium, molybdenum and tungsten, in an amount between about 0.5 and 15% by weight of the finished catalyst and a promoter selected from the group consisting of Group I, Group II, Rare Earth, and Group IVA metals of the Periodic System and mixtures thereof, in an amount between about 1 and 15% by weight based on the finished catalyst, both deposited on an inert oxide carrier; liquefying the effluent product, as by condensation or compression; flashing the dry gas portion containing hydrogen therefrom; if desired, further purifying the hydrogen by cryogenic, adsorption and diffusion methods, etc.; separating an unsaturated portion from a saturated portion of the remaining product, as by distillation, adsorption, solvent extraction, selective polymerization, selective aromatic alkylation, selective paraffin alkylation, etc., and recycling unreacted paraffins to the contacting step. The hydrogen recovered from the flashing step is also utilized for the hydrogenation of heavy unsaturated hydrocarbon materials, such as coal liquids, by contacting the heavy liquids with the hydrogen in the presence of a hydrogenation catalyst, preferably of the same character as the hydrogen-producing catalyst, and under conditions sufficient to hydrogenate the heavy liquids.

5 Claims, No Drawings

HYDROGEN PRODUCTION

REFERENCE TO PRIOR APPLICATIONS

This is a Continuation-in-part of copending Application Ser. No. 327,010, filed Jan. 20, 1973, now abandoned, which is a division of Application Ser. No. 92,243, filed Nov. 23, 1970, now U.S. Pat. No. 3,725,246, which was a continuation of Application Ser. No. 769,727, filed Oct. 22, 1968, now abandoned, but copending at the date of filing Ser. No. 92,243.

BACKGROUND OF THE INVENTION

The present invention relates to a method for producing hydrogen from light hydrocarbon paraffins, separating the hydrogen from the effluent product, and, if desired, hydrogenating heavy unsaturated hydrocarbons with said hydrogen.

At the present time, the hydrogen requirements of petroleum refineries, which are necessary for hydrogen treating operations, such as hydrogenation, hydrotreating, hydrocracking, etc., and for the production of petrochemicals, are extremely high. Hydrogen requirements are even higher in processes for treating liquids of a hydrocarbon nature which are highly unsaturated, such as liquids derived from coal. For example, coal liquids may be obtained from coal by carbonization or pyrolysis of the solid coal to produce coal tar products or by the solvent extraction of solid coal, with solvents such as tetralin, decalin and the like to produce a solvent extract, or combinations of these techniques. The hydrocarbon liquids produced from coal are extremely complex, generally cyclic or aromatic compounds, having a high degree of unsaturation or hydrogen deficiency. Consequently, in order to process such liquids further, it is necessary to stabilize such liquids by at least partial saturation so that they may be handled in high temperature equipment, both in distillation and catalytic processing, without extreme coking, plugging, etc. It is also necessary that such coal liquids be at least partially saturated in order to produce so-called synthetic petroleum which can then be processed in conventional manners in a petroleum refinery for the production of the usual petroleum-type products and, in some cases, some unusual products.

At the present time, the production of hydrogen for the petroleum-petrochemical industry is generally through the catalytic reforming of naphthas or the steam reforming of light hydrocarbons. The hydrogen available from catalytic reforming is rather limited and in short supply, so that more and more producers are resorting to steam reforming of light hydrocarbons to satisfy the massive hydrogen requirements of today's operations. However, even this technique has fallen short of today's demand of the petroleum refinery and it is nowhere near adequate for the production of hydrogen for the saturation of coal liquids. Another method for producing hydrogen is as a by-product of the production of unsaturated hydrocarbons. One such process involves the pyrolysis of hydrocarbons to produce products such as acetylene, ethylene and propylene. This system has the disadvantages of high temperature and low purity of the hydrogen stream. Another possible source of hydrogen is as a by-product of processes for the dehydrogenation of saturated hydrocarbons to produce the corresponding unsaturated hydrocarbons. While this is a relatively simple operation and large quantities of the saturated hydrocarbons are available as a raw material and at reasonable prices, these processes which have been developed have numerous drawbacks. For the most part, the processes developed to date are cyclic, adiabatic, fixed-bed, regenerative processes operating on short cycle times due to coke deposition on the catalyst. Typically, the cycle times in these cases are about 7 to 15 minutes. Therefore, for a continuous operation, a minimum of three reactors is required with one reactor on-stream, one being regenerated, and one on standby. Multiples of this system can be utilized to increase production.

It is therefore an object of the present invention to provide a process which overcomes the above-mentioned difficulties. Another object of the present invention is to provide a process for the production of substantial quantities of hydrogen. Another and further object of the present invention is to provide an improved process for the production of substantial quantities of hydrogen from light paraffinic hydrocarbons. Still another object of the present invention is to provide an improved process for the production of hydrogen by contacting light paraffinic hydrocarbons with a highly effective catalyst. Yet another ojbect of the present invention is to provide an improved process for the production of hydrogen by the dehydrogenation of light paraffinic hydrocarbons, separation of hydrogen from the effluent product and hydrogenation of coal liquids with the recovered hydrogen. Another and further object of the present invention is to provide an improved process for the production of hydrogen by contacting light parafinic hydrocarbons with a novel catalyst capable of extremely long cycle periods. A further object of the present invention is to provide an improved process for the production of hydrogen, including dehydrogenating light paraffinic hydrocarbons, liquefying the effluent product and recovering the hydrogen from the liquefied product by flashing a dry gas portion containing hydrogen therefrom. Yet another object of the present invention is to provide an improved process for the production of hydrogen wherein light paraffins are dehydrogenated, the effluent product is liquefied, the dry gas portion of the liquefied product is flashed to recover the hydrogen, and the hydrogen is further purified by the removal of other gases therefrom. A still further object of the present invention is to provide an improved process for the production of hydrogen wherein light paraffins are dehydrogenated, the effluent product is liquefied, the dry gas portion of the liquefied product is flashed to remove hydrogen therefrom and the remaining liquefied product is distilled to separate saturated from unsaturated products. Another object of the present invention is to provide a process for the production of hydrogen wherein light paraffins are dehydrogenated, the effluent product is liquefied, the liquefied product is flashed to remove the dry gas portion including hydrogen therefrom, the remaining liquefied product is separated into saturated and unsaturated fractions and the saturated fraction is recycled to the hydrogen production step. These and other objects and advantages of the present invention will be apparent from the following detailed description.

SUMMARY OF THE INVENTION

Briefly, in accordance with the present invention, high purity hydrogen is produced in substantial quantities by contacting light paraffinic hydrocarbons with a catalyst comprising an active metal selected from the group consisting of Group VIII and Group VIB of the Periodic System and a promoting amount of a metal selected from the group consisting of Group I, Group II, Rare Earth, Group IVB metals of the Periodic System, and mixtures thereof, both deposited on an inert oxide support; liquefying the effluent product; and flashing the liquefied product to remove a dry gas portion therefrom. The invention also provides an integrated process wherein the hydrogen flashed from the liquefied effluent product is contacted with coal liquids in the presence of a hydrogenation catalyst and under hydrogenation conditions.

Suitable feedstocks for use in accordance with the present invention include any light paraffinic hydrocarbons alone or in combination, such as ethane, propane, n-butane, iso-butane, n-pentane, iso-pentane, etc.

Processing conditions for the hydrogen production reaction are dependent upon the feedsotck employed. In general, temperatures between about 900° and 1250°F, pressures between about 100 and 2500 mm. mercury absolute, and liquid hourly space velocities from about 0.1 to 10 may be employed. More specifically, where ethane is the feedstock, the temperature should be between about 1100° and 1250°F. Where $C_3$ to $C_5$ paraffins are the feedstock, a temperature of 900° to 1150°F should be used. In either case, the remaining conditions may vary over the ranges given.

Hydrogen is recovered from the product stream by liquefying the effluent product. Such liquefication may be effected by conventional means, such as condensation, compression, etc. The liquefied product is then flashed to remove a dry gas portion therefrom. Such dry gas portion will include hydrogen, methane and ethane, while the remaining liquefied portion will contain propane, ethylene, propylene and other higher boiling hydrocarbons.

The recovered hydrogen may be further purified by cryogenic, adsorption, or diffusion methods or the like.

The separated hydrogen may be compressed and utilized in typical refining and petrochemical operations, such as hydrogenation, hydrotreating, hydrocracking, hydrodealkylation, etc. Preferably, however, the separated hydrogen is contacted with highly unsaturated coal liquids derived from solid coal. Such coal liquids may, for example, be obtained by crushing or grinding solid coal and subjecting the pulverized coal to carbonization or pyrolysis at elevated temperatures to produce liquid products. These liquid products may then be contacted with hydrogen from the previous operation to convert the same to a more saturated, highly aromatic product. It is also known that crushed or ground coal may be contacted with a suitable solvent, at slightly elevated temperatures, such as tetralin, decalin and other hydrogen transfer solvents, to thereby produce a solvent extract. By contacting this solvent extract with hydrogen, produced in accordance with the present invention, such extracts can be converted to hydrocarbon materials resembling, in many respects, petroleum crude oils. The only real difference between these hydrogenated coal liquids and petroleum crude oils is that the former contains a higher concentration of aromatics. However, the hydrogenated coal liquids may be processed in conventional refinery schemes which are used for petroleum.

The remaining liquefied effluent product may then be further separated to separate saturated from unsaturated hydrocarbons. Such separation can be accomplished by distillation, adsorption, solvent extraction, selective polymerization, selective alkylation of aromatics or paraffins, etc. The separated unsaturated products such as ethylene, propylene, n-butylene, iso-butylene, etc., are in and of themselves valuable products of commerce. The saturated or paraffinic products of the separation are then recycled to the initial hydrogen production reaction.

The hydrogenation of the coal liquids may be carried out in the presence of the same catalysts utilized for the hydrogen production reaction. However, any known hydrogenation catalyst may also be employed, such as Group VIII metals, for example, platinum, palladium, rhodium, nickel and cobalt, and Group VI metals, such as molybdenum or tungsten, or various combinations of these metals deposited on a carrier, such as alumina or silica. Hydrogenation conditions may include temperatures from about 450° to 850°F, preferably about 500° to 800°F, pressures of about 4000 to 10,000 psig., liquid hourly space velocities from about 0.1 to 10 and hydrogen-to-hydrocarbon mole ratios from about 1 to 20 to 1.

The term "liquid hourly space velocity" as used herein refers to the unit volumes of hydrocarbon feedstock (computed as a liquid at 60°F.) contacting a unit volume of catalyst per hour. Expressed in terms of "gas hourly space velocity" (the volume of gaseous hydrocarbon feedstock computed at 60°F. and 1 atmosphere contacting a unit volume of catalyst) the gas hourly space velocity can be from about 20 to about 2930 volumes of gas per unit volume of catalyst per hour.

The novel catalysts of the present invention include an active metal from Group VIII of the Periodic System, such as platinum, palladium, rhodium or nickel in concentrations of about 0.5 to 5% by weight based on the finished catalyst, or a Group VIB metal, such as chromium, molybdenum or tungsten, in amounts of about 5 to 15% by weight of the finished catalyst. The promoter of the present invention may include a Group IA metal, such as potassium, rubidium, cesium, etc., a Group II metal, such as calcium, magnesium, strontium, etc., a rare earth metal, such as cerium, thorium, etc., a Group IVA metal, such as tin or lead, or mixtures of these, particularly mixtures of a Group IVA metal with one of the other Groups mentioned. The promoters are preferably in their oxide form and are present in amounts of about 1 to 15% by weight based on the weight of the finished catalyst.

Both the active catalytic metal and the promoter are deposited on an inert oxide support, preferably an alumina of the gamma type, such as the bayerite, beta, etc., and boehmite crystalline forms. Other suitable supports of this character may also include other aluminas, silica-alumina, silica, silica-magnesia, alumina-magnesia, silica-zirconia, etc.

The catalysts may be prepared by techniques well known in the art. For example, such preparation may include coprecipitation or impregnation techniques. One may employ extrudates or pellets for impregnation, or powders followed by pelletization or extrusion to yield the finished catalyst. The active metal and the promoter are added by the use of water soluble salts, such as their halides, nitrates, sulfates, acetates, etc. Easily hydrolyzed salts can be kept in solution without decomposition by employing the appropriate inorganic acids. Wellknown procedures for drying and calcination of the catalyst may also be employed, such as vacuum drying and calcination in oxidative, neutral and reductive atmospheres, utilizing calcination temperatures of about 800° to 1200°F.

a period of 16 hours without noticeable reduction in hydrogen production or deactivation of the catalyst.

TABLE II

Run No. 3
Catalyst    12% $Cr_2O_3$-3% $K_2O$-2% SnO on $Al_2O_3$
Feed        Isobutane, 99.5% +
Conditions:

| | | | | | | | |
|---|---|---|---|---|---|---|---|
| Prerun Lineout, °F | 973 | | | | | | |
| Ave. Reaction, °F | 956 | 951 | 952 | 960 | 968 | 976 | 978 |
| Pressure, psig. | ~ | | | | | | |
| L.H.S.V. | 1.04 | | | | | | |
| w.H.S.V. | 0.69 | | | | | | |
| Results: at Time Indicated, Hr. | 0.75 | 3.00 | 6.00 | 9.00 | 12.00 | 15.00 | 16.00 |
| Analysis, G.C., Mole % | | | | | | | |
| $H_2$ | 24.2 | 31.1 | 30.1 | 29.0 | 28.8 | 29.0 | 29.4 |
| $CH_4$ | 0.6 | 0.1 | 0.2 | 0.1 | 0.1 | 0.4 | 0.5 |
| $C_2$'s | 0.3 | 0.1 | 70.1 | 70.1 | 70.1 | 0.1 | 70.1 |
| $C_3$ | 0.2 | 0.3 | 0.3 | 0.3 | 0.3 | 0.3 | 0.3 |
| $C_3=$ | 0.4 | 0.1 | 0.1 | 0.1 | 0.2 | 0.2 | 0.2 |
| i-$C_4$ | 56.7 | 42.1 | 43.3 | 43.9 | 44.1 | 44.3 | 44.4 |
| n-$C_4$ | 0.1 | 0.1 | 0.1 | 70.1 | 70.1 | 70.1 | 70.1 |
| i-$C_4=$ | 17.4 | 26.0 | 25.8 | 26.5 | 26.4 | 25.6 | 25.1 |
| $C_4$-2= | 0.1 | 0.1 | 0.1 | 0.1 | 0.1 | 0.1 | 0.1 |
| Carbon on Catalyst, wt.% | | | | | | | |
| Conversion of isobutane | 24.60 | 38.81 | 37.97 | 38.26 | 38.15 | 37.66 | 36.84 |

As previously indicated, prior techniques for the production of hydrogen involve dehydrogenation of paraffins over catalysts having extremely short cycle times. By way of contrast, the present process can be carried out over substantially longer periods of time without serious deactivaton of the catalyst or reduction in the volume of hydrogen produced. The following table shows the production of hydrogen from propane utilizing 11 and 88-minute cycles on certain of the catalysts of the present invention.

TABLE I

1110°F, 810 mm Hg absolute, 5 LHSV
Propane Feed

| Run | 1 | | 2 | |
|---|---|---|---|---|
| Catalyst | 10$Cr_2O_3$-2$K_2O$-$Al_2O_3$ | | 10$Cr_2O_3$-4SnO-$Al_2O_3$ | |
| Time-Min. | 11 | 88 | 11 | 88 |
| Conversion | 39.0 | 32.9 | 28.8 | 26.1 |
| Product Dist. Mole % | | | | |
| $H_2$ | 26.4 | 23.1 | 22.4 | 20.9 |
| Methane | 2.7 | 2.2 | 1.5 | 1.4 |
| Ethane | 2.7 | 1.9 | 1.5 | 1.4 |
| Dry Gas Concentration | | | | |
| $H_2$ | 83 | 85 | 88 | 88 |
| Methane | 8 | 8 | 6 | 6 |
| Ethane | 9 | 7 | 6 | 6 |

The following Table 2 illustrates the production of hydrogen from iso-butane utilizing a catalyst in accordance with the present invention, and carried out over When reference is made herein to the Periodic System of elements, the particular groupings referred to are as set forth in the Periodic Chart of the Elements, in "The Merck Index", Seventh Edition, Merck & Co., Inc., 1960.

We claim:

1. A process for the production of hydrogen, comprising contacting paraffinic hydrocarbons consisting essentially of $C_2$ to $C_5$ hydrocarbons with a catalyst consisting essentially of a catalytic amount of a Group VIB metal of the Periodic System, and a promoting amount of Group IA metal of the Periodic System, both deposited on an enert oxide carrier, at a temperature between about 900°F. and about 1250°F, an absolute pressure of between about 100 and 2500 mm of mercury, and a gas hourly space velocity of about 20 to about 2930 volumes of gaseous hydrocarbon feedstock, computed at 60°F. and 1 atmosphere, per unit volume of catalyst per hour, liquefying the effluent product and flashing a dry gas portion containing hydrogen therefrom.

2. A process in accordance with claim 1 wherein the promoting metal is in its oxide form.

3. A process in accordance with claim 1 wherein the inert oxide carrier is a gamma alumina.

4. A process in accordance with claim 1 wherein the effluent product is liquefied by condensation.

5. A process in accordance with claim 1 wherein the effluent product is liquefied by compression.

* * * * *